(12) United States Patent
Palm

(10) Patent No.: US 6,955,340 B2
(45) Date of Patent: Oct. 18, 2005

(54) VARIABLE STEAM INJECTOR

(75) Inventor: Bengt Palm, Genarp (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 143 days.

(21) Appl. No.: 10/433,009

(22) PCT Filed: Nov. 28, 2001

(86) PCT No.: PCT/SE01/02627

§ 371 (c)(1),
(2), (4) Date: Nov. 21, 2003

(87) PCT Pub. No.: WO02/43848

PCT Pub. Date: Jun. 6, 2002

(65) Prior Publication Data

US 2004/0070090 A1 Apr. 15, 2004

(30) Foreign Application Priority Data

Nov. 29, 2000 (SE) .............................................. 0004390

(51) Int. Cl.⁷ .................................................. B01F 3/04
(52) U.S. Cl. ............................. 261/62; 99/452; 99/460; 261/76; 261/DIG. 10; 261/DIG. 76
(58) Field of Search .......................... 261/62, 76, 124, 261/DIG. 10, DIG. 13, DIG. 76; 99/452, 460; 426/474, 476

(56) References Cited

U.S. PATENT DOCUMENTS

| | | | | |
|---|---|---|---|---|
| 935,015 A | * | 9/1909 | Guimont | 261/64.1 |
| 1,371,250 A | * | 3/1921 | Larkworthy | 261/161 |
| 2,682,827 A | * | 7/1954 | Gressly | 99/473 |
| 2,820,620 A | * | 1/1958 | Anderson | 261/124 |
| 2,822,157 A | * | 2/1958 | Porter | 261/124 |
| 3,219,483 A | * | 11/1965 | Goos et al. | 127/28 |
| 3,857,514 A | * | 12/1974 | Clifton | 239/132 |
| 3,984,504 A | | 10/1976 | Pick | 261/76 |
| 4,139,585 A | * | 2/1979 | Kirschner et al. | 261/64.1 |
| 4,278,619 A | * | 7/1981 | Tiefenthaler | 261/62 |
| 4,473,512 A | * | 9/1984 | Pick et al. | 261/62 |
| 5,395,569 A | * | 3/1995 | Badertscher et al. | 261/62 |
| 6,189,871 B1 | * | 2/2001 | Schlageter et al. | 261/78.2 |

FOREIGN PATENT DOCUMENTS

| | | | | |
|---|---|---|---|---|
| EP | 0839461 A1 | | 5/1998 | |
| JP | 62-27064 | * | 2/1987 | 261/76 |

\* cited by examiner

*Primary Examiner*—Richard L. Chiesa
(74) *Attorney, Agent, or Firm*—Burns Doane Swecker & Mathis LLP

(57) ABSTRACT

The invention relates to a variable steam injector of the type which has an injector housing (1) with an inlet (2) for the product which is to be heated and an outlet (3) for the heated product. The injector housing (1) also has an inlet (4) for steam. The injector also includes a thick-walled pipe (5) enclosed in the injector housing (1). The thick-walled pipe (5) is provided with a large number of throughgoing holes which form radial ducts (9). Further, there is a product pipe (11) within the thick-walled pipe (5) and which is displaceable in the longitudinal direction of the pipe (5).

7 Claims, 2 Drawing Sheets

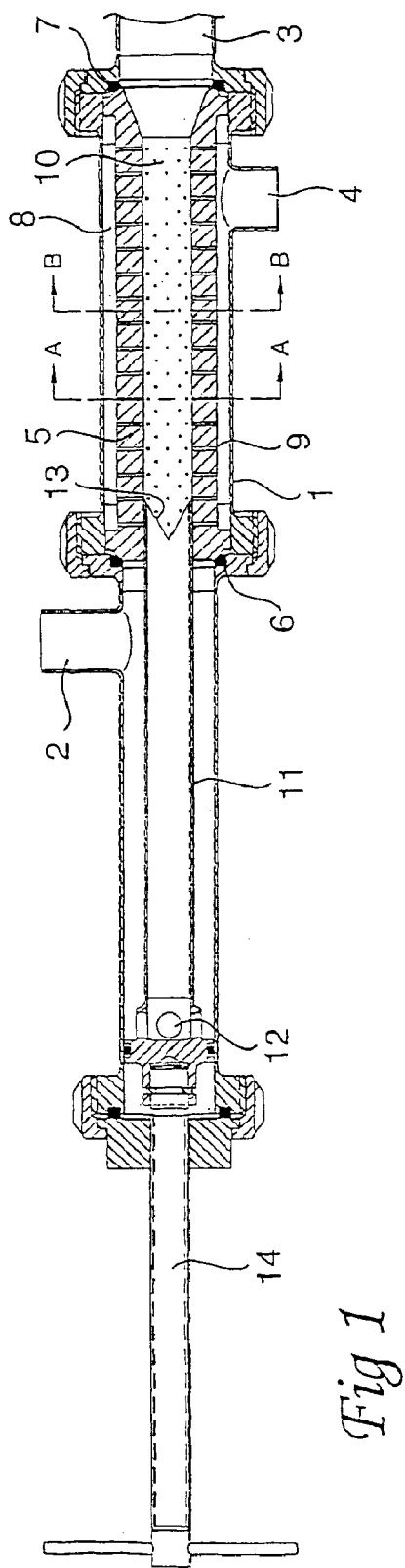

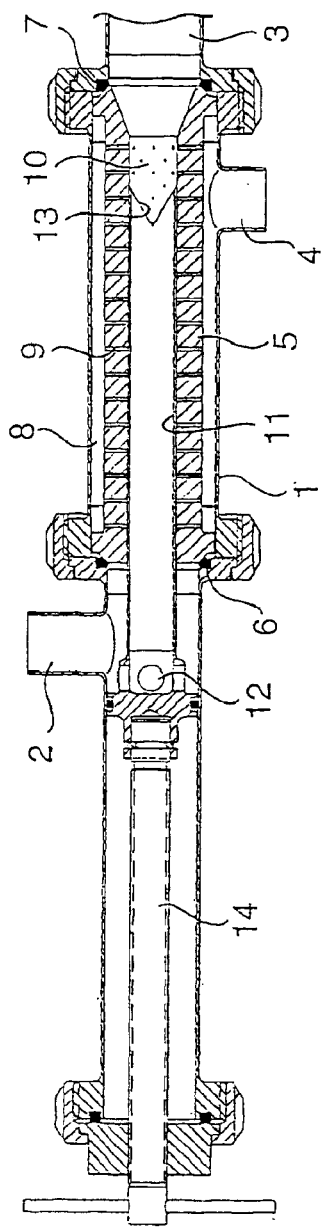
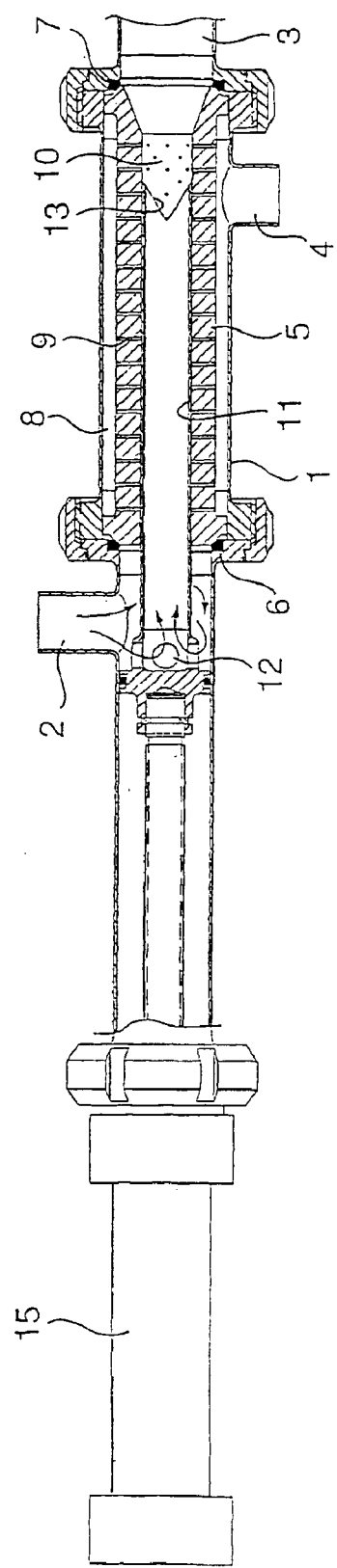
Fig 4
Fig 5

VARIABLE STEAM INJECTOR

This application is a national stage of International Application No. PCT/SE01/02627, filed on Nov. 28, 2001.

TECHNICAL FIELD

The present invention relates to a variable steam injector comprising an injector housing with an inlet for a product, an outlet for the product and a steam inlet, the injector further including a thick-walled pipe enclosed in the injector housing and having a large number of through-going holes which form substantially radial ducts.

BACKGROUND ART

As regards the heat treatment of liquid or pumpable foods, use can be made of steam in order to heat the food product in rapid and efficient manner. One of the methods employed for injecting steam direct into the product is to use an injector.

Depending upon the temperature to which it is desired to heat the product, it is possible to obtain a pasteurised or aseptic product, or alternatively a product possessing extended shelf life in cold storage. The commonest method is to heat the product which, for example, may be dairy produce, juices, viscous fruit products or the like, to a temperature where a total destruction of harmful microorganisms is obtained, this gives a food product which keeps stable on storage at room temperature. No unbroken refrigerated chain from storage is necessary, which may be an advantage, particularly in the developing countries.

Direct heating of the product by injecting steam into the product gives a rapid and efficient heating. As a result of this rapid method, it is possible to reduce the treatment time, which in total gives a reduced heat action on the product and a product will be obtained which maintains a higher level of quality, above all in terms of flavour.

There is a large number of injectors on the market which all display similar construction, with an inlet for the product which is to be treated and an outlet for the ready-treated product. The injector further has an inlet for steam under high pressure which, through various arrangements with gaps or ducts, is caused to intermingle with the product and which heats the product to the desired temperature. Depending upon the construction of the injector, with gaps, or ducts, it may be suitable for products possessing different viscosities.

European Patent Specification EP 839 461 describes an injector particularly suited for viscous products. Within the injector housing, there is a thick-walled pipe with a large number of through-going channels or ducts. The product passes inside the pipe and steam is supplied through the ducts. Outside the thick-walled pipe, there is a control sleeve which may displaced in the longitudinal direction of the pipe in order, by such means, to regulate the quantity of supplied steam and thereby regulate the temperature to which the product is to be heated. The thick-walled pipe is manufactured from some plastics material or a ceramic, while the control sleeve is manufactured from stainless steel.

The disadvantages inherent in an injector possessing a construction as described above is that there is an inner pipe with a high coefficient of thermal expansion and a surrounding sleeve which has a considerably lower coefficient of thermal expansion. For such an injector to be easy to regulate, there must be a relatively large clearance between the parts, with the result that steam leaks out between the parts and a much poorer and less distinct regulation of the injector is obtained. In that the product passes through the pipe with a number of small ducts, there is also the risk that the product "migrates out" in the ducts and the injector thereby becomes more difficult to clean, which is a major disadvantage for equipment for the food industry where extremely high demands are placed on hygiene.

SUMMARY OF THE INVENTION

One object of the present invention is to realise an injector whose design and construction obviate the above-addressed problems and which give an efficiently variable steam injection, particularly adapted for viscous products.

This and other objects have been attained according to the present invention in that the steam injector of the type described by way of introduction has been given the characterising feature that there is a product pipe disposed within the thick-walled pipe and steplessly displaceable in the longitudinal direction of the pipe.

Preferred embodiments of the present invention have further been given the characterising features as set forth in the appended subclaims.

BRIEF DESCRIPTION OF THE DRAWINGS

Preferred embodiments of the apparatus according to the present invention will now be described in greater detail hereinbelow, with reference to the accompanying Drawings, in which:

FIG. 1 shows, partly in section, a side elevation of an injector according to the present invention in a first embodiment adjusted to maximum position;

FIG. 2 is a cross section taken along the line A—A in FIG. 1;

FIG. 3 is a cross section taken along the line B—B in FIG. 1;

FIG. 4 shows, partly in section, a side elevation of an injector according to the present invention in a first embodiment adjusted to minimum position; and FIG. 5 shows, partly in section, a side elevation of an injector according to the present invention in a second embodiment.

The Drawings show only those parts and details essential to an understanding of the present invention, and the location of the injector in a heat treatment plant, which is well-known to a person skilled in the art, has been omitted.

DETAILED DESCRIPTION OF THE INVENTION

FIGS. 1 and 4 show a first embodiment of the present invention and FIG. 5 shows a second embodiment. The injector according to the present invention has a closed injector housing 1 of substantially tubular appearance. The injector housing 1 displays an inlet 2 for a product, as well as an outlet 3 for the product. The injector housing 1 also has an inlet 4 for steam. The injector housing 1 is suitably manufactured from stainless steel, since this is a suitable material for foods and since it is easy to wash clean efficiently.

Within a part of the injector housing 1, there is disposed a thick-walled pipe 5. That part of the injector housing 1 in which the thick-walled pipe is located is discrete from the remaining part of the injector housing 1 and from the product outlet 3 by means of seals 6 and 7. Between the thick-walled pipe and the injector housing 1, there is a space 8 for the steam which is to enter in through the steam inlet 4.

The thick-walled pipe 5 is manufactured from a food-approved plastic, for example non-recycled PEEK (polyetheretherketone). The pipe 5 may also be manufactured from ceramic or similar material which withstands a high pressures and which does not absorb liquid. The material should also be food-approved. In that the pipe 5 is manufactured with thick walls of a material which is a poor thermal conductor, the pipe 5 will insulate between the steam-filled space 8 outside the pipe 5 and the interior 10 of the pipe 5.

In the thick-walled pipe 5, there is provided a large number of small, through-going holes which form a large number of ducts 9 between the steam space 8 and the interior 10 of the pipe 5. The ducts 9 are substantially radial and they are distributed in rows along the longitudinal direction of the pipe 5. As shown in FIGS. 2 and 3, every other row of ducts 9 is offset half a pitch between the ducts 9.

Within the thick-walled pipe 5, there disposed a product pipe 11. The product pipe 11 has, in its one end, an inlet 12 for the product which enters in through the inlet 2. By placing the inlet 12 as far as possible away from the product outlet 3, the product will be caused to flow through the injector in the same manner, regardless of in which regulation position the injector is located.

The product pipe 11 is intended to be steplessly displaceable in the thick-walled pipe 5. FIG. 1 shows a maximum position for the product pipe 11 where the greater part of the product pipe 11 is located in that part of the injector housing 1 where the thick-walled pipe 5 is not positioned. FIG. 4 shows a minimum position for the product pipe 11, where the greater part of the product pipe 11 is located in the interior 10 of the thick-walled pipe 5.

In that end opposed to its inlet 12, the product pipe 11 is formed with a V-notching 13. By altering the angle and/formation of the V-notched portion 13, it is possible to modify the regulation characteristic of the injector. By displacing the product pipe 11 in the thick-walled pipe 5, more or fewer of the ducts 9 through which the steam can pass will be exposed.

In the first preferred embodiment of the present invention, which is shown in FIGS. 1 and 4, the injector is regulated manually by means of a threaded regulator device 14. Alternatively, it is possible, as in FIG. 5, to provide the injector according to the present invention with an electric, pneumatic or hydraulic switching device 15. The switching device 15 may be controlled by temperature regulation, where a temperature indicator (not shown) is placed immediately after the outlet 3 of the injector. Alternatively, the switching device 15 may be controlled by means of a constant pressure regulator where the pressure difference across the stream ducts 9 is measured, as well as a temperature sensor which, via a temperature regulator or a standard regulator valve, raises or lowers the pressure of the steam passing into the injector.

The product which enters in through the product inlet 2 may be a relatively viscous food product, such as partly frozen juice concentrate, jams, ice cream mix, sauces and soups with or without particles, or the like. The injector may naturally also be employed for less viscous products. When the product consists of a partly frozen juice concentrate, it may be crucially important rapidly to be able to regulate the supply of steam to the injector, since the juice concentrate may contain large or small lumps of ice crystals, which gives a varied need of supplied energy in order to be able to achieve the desired temperature of the product.

The product which passes in through the inlet 2 enters into the injector housing 1 and passes further in through the inlet 12 of the product pipe 11. The route taken by the product is shown by means of arrows in FIG. 5. The product is caused to pass through the product pipe 11, it continuing into a larger or smaller section of the thick-walled pipe 5, depending on in which regulating position the product pipe 11 is located. Since the product pipe 11 covers the ducts 9 which do not supply steam to the product, there is no risk that product "migrates out" in the inactive ducts 9. When product passes into the thick-walled pipe 5, steam is supplied under high pressure through the exposed ducts 9 and the steam will then prevent the product from "migrating out" in the ducts 9.

If the product pipe 11 is located in the maximum position (FIG. 1), the maximum number of steam ducts 9 is exposed and a large quantity of steam may pass into the product. The steam being distributed in a large number of small ducts 9, an extremely good distribution of the steam in the product will be obtained, and thereby a rapid and efficient heating of the product to the desired temperature.

If the product pipe 11 is in its minimum position (FIG. 4), a minimum number of steam ducts 9 is consequently exposed, and a minimum quantity of steam is permitted to pass into the product.

Once the product has been heated to the desired temperature, as a result of the supplied steam, the product departs from the injector through the outlet 3. After the outlet 3, there is normally disposed a buffer tank (not shown) for keeping the product at the desired temperature for a given, preselected time interval. Thereafter, the product is passed further, for example to cooling and possible further treatment, as well as to final packing in consumer packages.

As will have been apparent from the foregoing description, the present invention realises a variable steam injector which simply and efficiently may be regulated and which does not display the drawbacks inherent in prior art injectors.

What is claimed is:

1. A variable steam injector comprising an injector housing with an inlet for a product, an outlet for the product and a steam inlet, the injector further including a thick-walled pipe enclosed in the injector housing and having a large number of through-going holes which form substantially radial ducts, wherein within the thick-walled pipe, there is disposed a product pipe which is steplessly displaceable in the longitudinal direction of the thick-walled pipe.

2. The variable steam injector as claimed in claim 1, wherein the product pipe is displaced by means of a switching device, said switching device being controlled by a temperature regulator, by the intermediary of a temperature indicator placed immediately after the outlet of the injector.

3. The variable steam injector as claimed in claim 1, wherein the product pipe is displaced by means of a switching device, said switching device being controlled by a constant pressure regulator, in that the pressure difference across the ducts is measured.

4. The variable steam injector as claimed in claim 1, wherein the product pipe may be displaced between a maximum position and a minimum position.

5. The variable steam injector as claimed claim 1, wherein the product pipe is, in its one end, V-notched in order to be able to control the regulation characteristic of the injector.

6. The variable steam injector as claimed in claim 5, wherein the product pipe has an inlet for product in its opposing end to the V-notched end.

7. The variable steam injector as claimed claim 1, wherein the radial ducts are disposed in rows along the longitudinal direction of the thick-walled pipe, and that every other row of ducts is offset half a pitch between the ducts.

* * * * *